(12) United States Patent
Tiwari (10) Patent No.: US 9,955,455 B2
(45) Date of Patent: Apr. 24, 2018

(54) DEVICE AND METHOD OF HANDLING PAGING PROCEDURE

(71) Applicant: HTC Corporation, Taoyuan (TW)

(72) Inventor: Kundan Tiwari, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/291,073

(22) Filed: Oct. 12, 2016

(65) Prior Publication Data

US 2017/0105192 A1 Apr. 13, 2017

Related U.S. Application Data

(60) Provisional application No. 62/239,988, filed on Oct. 12, 2015.

(51) Int. Cl.
*H04W 68/00* (2009.01)
*H04W 68/02* (2009.01)
*H04W 24/02* (2009.01)
(Continued)

(52) U.S. Cl.
CPC .......... *H04W 68/02* (2013.01); *H04W 24/02* (2013.01); *H04W 68/005* (2013.01); *H04W 76/048* (2013.01); *H04W 76/007* (2013.01)

(58) Field of Classification Search
None
See application file for complete search history.

(56) References Cited

U.S. PATENT DOCUMENTS

2003/0153370 A1 8/2003 Sako
2010/0130237 A1* 5/2010 Kitazoe ............... H04W 76/048
455/458
(Continued)

FOREIGN PATENT DOCUMENTS

EP 1986458 A1 10/2008
EP 2903333 A1 8/2015
(Continued)

OTHER PUBLICATIONS

Search Report dated Feb. 3, 2017 for EP application No. 16193436.9, pp. 1-12.
(Continued)

*Primary Examiner* — Moustapha Diaby
(74) *Attorney, Agent, or Firm* — Winston Hsu (57) ABSTRACT

A communication device of handling a paging procedure comprises instructions of transmitting a first Non Access Stratum (NAS) message comprising a first time interval for monitoring a paging occasion and a second time interval for monitoring the paging occasion to a network, wherein the second time interval is larger than the first time interval; receiving a second NAS message comprising a third time interval for monitoring the paging occasion from the network after transmitting the first NAS message, wherein the third time interval is larger than the first time interval; receiving a paging message from the network by using the third time interval, when a packet data network (PDN) connection for an emergency bearer service is not established or not establishing; and receiving the paging message from the network by using the first time interval, when the PDN connection for the emergency bearer service is established or establishing.

19 Claims, 6 Drawing Sheets

(51) Int. Cl.
*H04W 76/04* (2009.01)
*H04W 76/00* (2018.01)

(56) References Cited

U.S. PATENT DOCUMENTS

| | | | |
|---|---|---|---|
| 2012/0094627 A1* | 4/2012 | Suh | H04W 4/22 |
| | | | 455/404.1 |
| 2014/0161007 A1 | 6/2014 | Donthi | |
| 2014/0221023 A1* | 8/2014 | Maggenti | H04W 68/02 |
| | | | 455/458 |

FOREIGN PATENT DOCUMENTS

| | | |
|---|---|---|
| WO | 2013017929 A1 | 2/2013 |
| WO | 2013035984 A1 | 3/2013 |
| WO | 2013051865 A2 | 4/2013 |

OTHER PUBLICATIONS

Ericsson, ST-Ericsson, "Further discussion on UE-supported DRX configuration", 3GPP TSG-RAN WG2 #77bis, Tdoc R2-121517, Mar. 26-30, 2012, Jeju, South Korea, XP050606081, pp. 1-4.
3GPP TS 24.008 V13.3.0, Sep. 2015.
3GPP TS 24.301 V13.3.0 (Sep. 2015).
3GPP TS 25.133 V12.8.0 (Jul. 2015).
3GPP TSG-CT WG1 Meeting #94 C1-153410 Oct. 12-17, 2015.
3GPP TSG-SA2 WG2 Meeting #110 S2-152354 Jul. 6-10, 2015.
3GPP TSG-SA2 WG2 Meeting #110 S2-152618 Jul. 6-10, 2015.
Office action dated Dec. 12, 2017 for the Taiwan application No. 105132863, filing date Oct. 12, 2016, p. 1-12.

* cited by examiner

DEVICE AND METHOD OF HANDLING PAGING PROCEDURE

CROSS REFERENCE TO RELATED APPLICATIONS

This application claims the benefit of U.S. Provisional Application No. 62/239,988, filed on Oct. 12, 2015, which is incorporated herein by reference.

BACKGROUND OF THE INVENTION

1. Field of the Invention

The present invention relates to a communication device and a method used in a wireless communication system, and more particularly, to a communication device and method of handling a paging procedure in a wireless communication system.

2. Description of the Prior Art

A user equipment (UE) capable of using an extended discontinuous reception (DRX) parameter cycle transmits an extended DRX parameter to a network, when performing an attach procedure or a tracking area update procedure. The network transmits the same or different extended DRX parameters to the UE, if the network supports the extended DRX parameter and accepts the request from the UE. The UE listens to a paging channel for a paging request by using the same extended DRX parameter transmitted from the network. The extended (e.g., longer) DRX parameter refers that the UE wakes up to listen to the paging channel after an extended duration. Further, the UE attached to a normal service initiates a procedure to establish a packet data network (PDN) connection for an emergency bearer service, and the UE transfers to an idle mode during the procedure because a radio link failure occurs. However, it is unknown which one of the extended DRX parameter and a DRX parameter should be used by the UE, when the UE listens to the paging channel. In addition, it is unknown which one of the extended DRX parameter and the DRX parameter should be used by the network (e.g. Mobility Management Entity (MME)), when the network transmits the paging request to an evolved Node-B (eNB). Thus, the UE and the network may not be synchronous for the paging procedure. As a result, the emergency bearer service (e.g., an emergency call reestablishment procedure) may be delayed.

Thus, how to handle a paging procedure is an important problem to be solved.

SUMMARY OF THE INVENTION

The present invention therefore provides a method and related communication device for handling a paging procedure to solve the abovementioned problem.

A communication device of handling a paging procedure in a wireless communication system comprises a storage unit for storing instructions and a processing circuit coupled to the storage unit. The processing means is configured to execute the instructions stored in the storage unit. The instructions comprise transmitting a first Non Access Stratum (NAS) message comprising a first time interval for monitoring a paging occasion and a second time interval for monitoring the paging occasion to a network, wherein the second time interval is larger than the first time interval; receiving a second NAS message comprising a third time interval for monitoring the paging occasion from the network after transmitting the first NAS message, wherein the third time interval is larger than the first time interval; receiving a paging message from the network by using the third time interval, when a packet data network (PDN) connection for an emergency bearer service is not established or not establishing; and receiving the paging message from the network by using the first time interval, when the PDN connection for the emergency bearer service is established or establishing.

A network of handling a paging procedure in a wireless communication system comprises a storage unit for storing instructions and a processing circuit coupled to the storage unit. The processing means is configured to execute the instructions stored in the storage unit. The instructions comprise receiving a first Non Access Stratum (NAS) message comprising a first time interval for monitoring a paging occasion and a second time interval for monitoring the paging occasion from a communication device, wherein the second time interval is larger than the first time interval; transmitting a second NAS message comprising a third time interval for monitoring the paging occasion to the communication device and storing the first time interval and the third time interval after receiving the first NAS message, wherein the third time interval is larger than the first time interval; performing the paging procedure by using the third time interval, when a packet data network (PDN) connection for an emergency bearer service is not established or not establishing; and performing the paging procedure by using the first time interval, when the PDN connection for the emergency bearer service is established or establishing.

A communication device of handling a paging procedure in a wireless communication system comprises a storage unit for storing instructions and a processing circuit coupled to the storage unit. The processing means is configured to execute the instructions stored in the storage unit. The instructions comprise transmitting a first Non Access Stratum (NAS) message comprising a first time interval for monitoring a paging occasion and a second time interval for monitoring the paging occasion to a network, wherein the second time interval is larger than the first time interval; receiving a second NAS message comprising a third time interval for monitoring the paging occasion from the network after transmitting the first NAS message, wherein the third time interval is larger than the first time interval; receiving a paging message from the network by using the third time interval; transmitting a third NAS message to establish a packet data network (PDN) connection for an emergency bearer service to the network; receiving a fourth NAS message for indicating the communication device to use the first time interval from the network, after transmitting the third NAS message; and receiving the paging message from the network by using the first time interval, after receiving the fourth NAS message.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
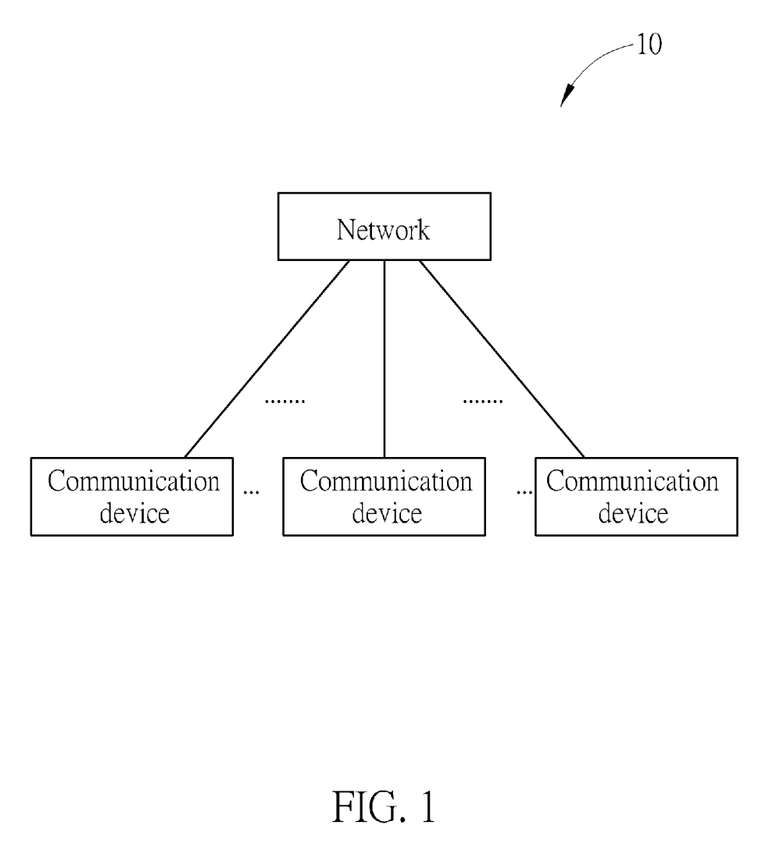
FIG. 1 is a schematic diagram of a wireless communication system according to an example of the present invention.

FIG. 1 is a schematic diagram of a wireless communication system 10 according to an example of the present invention. The wireless communication system 10 comprises a network and a plurality of communication devices. In FIG. 1, the network and the communication devices are simply utilized for illustrating the structure of the wireless communication system 10. Practically, the network may be a universal terrestrial radio access network (UTRAN) comprising at least one Node-B (NB) in a universal mobile telecommunications system (UMTS). In another example, the network can be an evolved UTRAN (E-UTRAN) comprising at least one evolved NB (eNB) and/or at least one relay in a long term evolution (LTE) system, a LTE-Advanced (LTE-A) system, an evolution of the LTE-A system or a fifth generation (5G) network.

Furthermore, the network may also include both the UTRAN/E-UTRAN and a core network (e.g., evolved packet core (EPC) network), wherein the core network may include network entities such as Mobility Management Entity (MME), Serving Gateway (S-GW), Packet Data Network (PDN) Gateway (P-GW), Self-Organizing Networks (SON) server and/or Radio Network Controller (RNC), etc.

The communication device may be a user equipment (UE), a mobile phone, a laptop, a tablet computer, an electronic book, a portable computer system, a vehicle or aircraft. In addition, the network and the communication device can be seen as a transmitter or a receiver according to transmission direction, e.g., for an uplink (UL), the communication device is the transmitter and the network is the receiver, and for a downlink (DL), the network is the transmitter and the communication device is the receiver.

Figure 2:
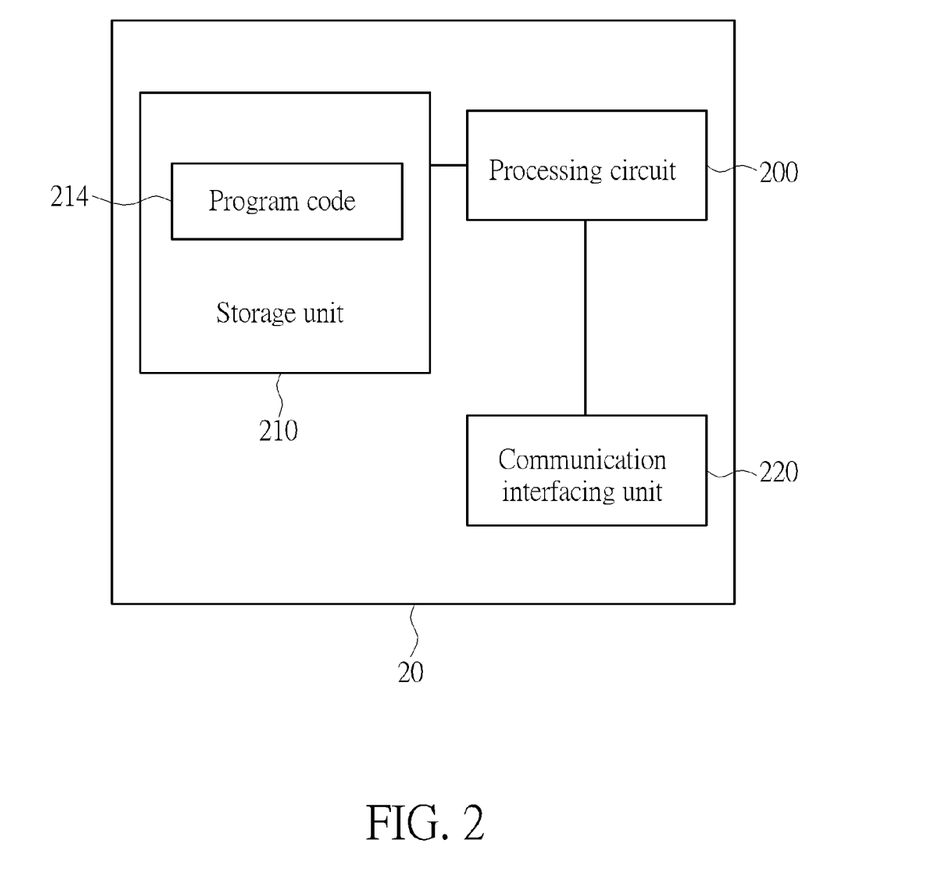
FIG. 2 is a schematic diagram of a communication device according to an example of the present invention.

FIG. 2 is a schematic diagram of a communication device 20 according to an example of the present invention. The communication device 20 may be the communication device or the network shown in FIG. 1, but is not limited herein. The communication device 20 may include a processing circuit 200 such as a microprocessor or Application Specific Integrated Circuit (ASIC), a storage unit 210 and a communication interfacing unit 220. The storage unit 210 may be any data storage device that may store a program code 214, accessed and executed by the processing circuit 200. Examples of the storage unit 210 include but are not limited to a subscriber identity module (SIM), read-only memory (ROM), flash memory, random-access memory (RAM), Compact Disc Read-Only Memory (CD-ROM), digital versatile disc-ROM (DVD-ROM), Blu-ray Disc-ROM (BD-ROM), magnetic tape, hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing circuit 200.

In the following embodiments, a UE is used to represent the communication device in FIG. 1, to simplify the illustration of the embodiments.

Figure 3:
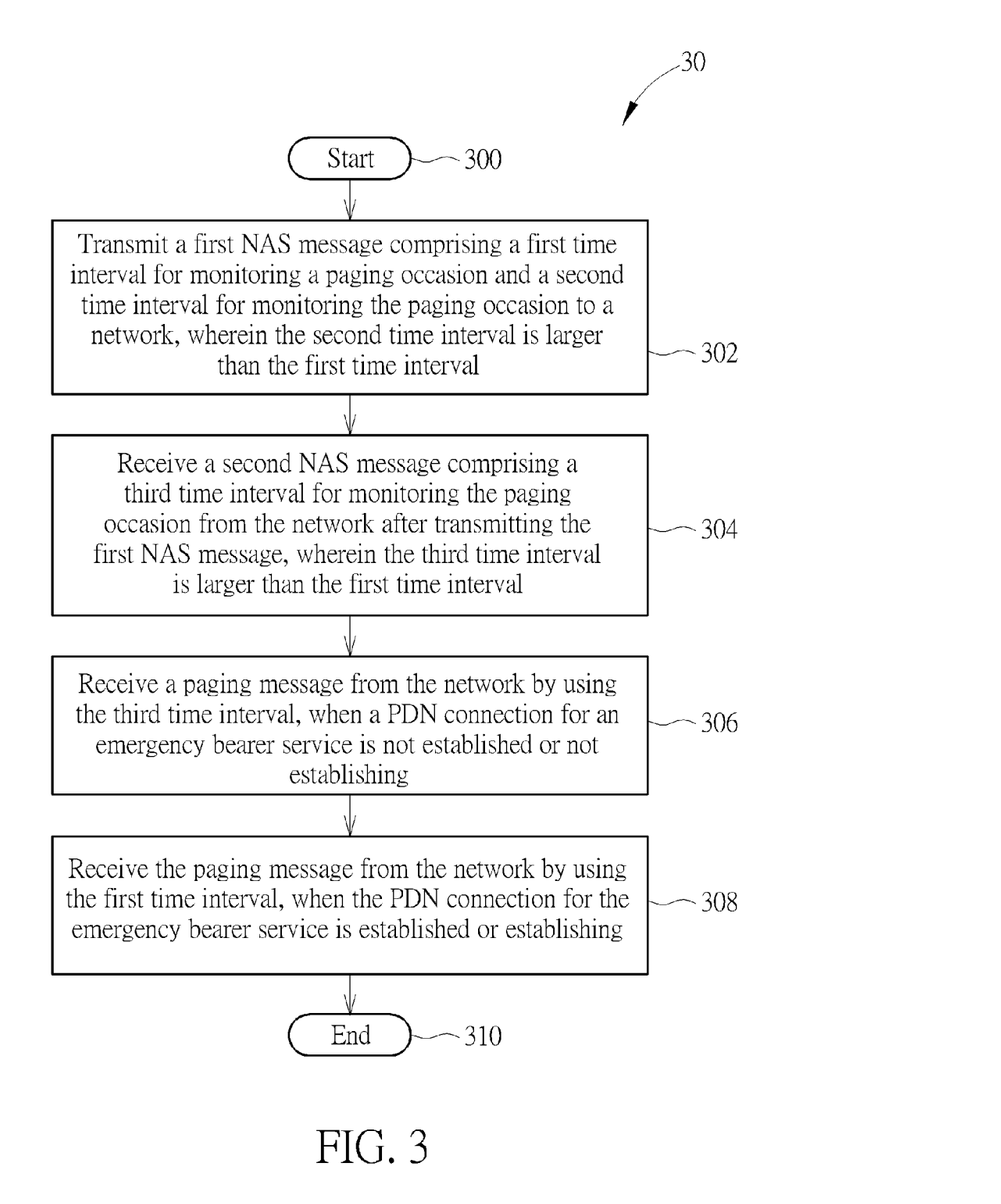
FIG. 3 is a flowchart of a process according to an example of the present invention.

FIG. 3 is a flowchart of a process 30 according to an example of the present invention. The process 30 may be utilized in a UE, to handle a paging procedure in a wireless communication system. The process 30 includes the following steps:

Step 300: Start.

Step 302: Transmit a first Non Access Stratum (NAS) message comprising a first time interval for monitoring a paging occasion and a second time interval for monitoring the paging occasion to a network, wherein the second time interval is larger than the first time interval.

Step 304: Receive a second NAS message comprising a third time interval for monitoring the paging occasion from the network after transmitting the first NAS message, wherein the third time interval is larger than the first time interval.

Step 306: Receive a paging message from the network by using the third time interval, when a PDN connection for an emergency bearer service is not established or not establishing.

Step 308: Receive the paging message from the network by using the first time interval, when the PDN connection for the emergency bearer service is established or establishing.

Step 310: End.

According to the process 30, the UE may transmit a first NAS message including a first time interval for monitoring a paging occasion and a second time interval for monitoring the paging occasion to a network, wherein the second time interval is larger than the first time interval. Then, the UE may receive a second NAS message in response to the first NAS message including a third time interval for monitoring the paging occasion from the network after (e.g., in response to) transmitting the first NAS message, wherein the third time interval is larger than the first time interval. The UE may receive a paging message from the network by using the third time interval, when a PDN connection for an emergency bearer service is not established or not establishing. The UE may receive the paging message from the network by using the first time interval, when the PDN connection for the emergency bearer service is established or establishing. That is, the UE uses a longer time interval (e.g., the third time interval) when the PDN connection for the emergency bearer service is not established or not establishing, and uses a shorter time interval (e.g., the first time interval) when the PDN connection for the emergency bearer service is established or establishing. In other words, the UE is able to handle the paging procedure, no matter whether the PDN connection for the emergency bearer service is established or establishing, or is not established or not establishing. As a result, the problem of handling the paging procedure is solved.

Realization of the process 30 is not limited to the above description.

In on example, the first time interval may be used for a discontinuous reception (DRX) parameter (i.e., non-extended DRX parameter or regular DRX), and/or the second time interval and the third time interval may be used for extended DRX parameters. In on example, the second time interval and the third time interval may be the same time interval or different time intervals.

In on example, the first NAS message may be an "ATTACH REQUEST" message, a "ROUTING AREA UPDATE REQUEST" message or a "TRACKING AREA UPDATE REQUEST" message. In on example, the second NAS message may be an "ATTACH ACCEPT" message, a "ROUTING AREA UPDATE ACCEPT" message or a "TRACKING AREA UPDATE ACCEPT" message.

In on example, the first time interval may be encoded in a DRX parameter information element of the "ATTACH REQUEST" message, the "ROUTING AREA UPDATE REQUEST" message or the "TRACKINGA AREA UPDATE REQUEST" message. In on example, the second time interval and the third time interval may be encoded in an extended DRX parameter information element (e.g., as defined in the 3rd Generation Partnership Project (3GPP) document(s)).

In on example, the PDN connection for the emergency bearer service may be establishing, if the UE transmits a session management (SM) message or an Evolved Packet Service (EPS) SM (ESM) message to activate a Packet Data Protocol (PDP) context or an EPS context for the emergency bearer service but a complete procedure for establishing the PDP context or the EPS context is not completed. For example, the UE may transmit a "PDN CONNECTION REQUEST" message with a request type set to the emergency bearer service, and may not receive an "ACTIVATE DEFAULT EPS BEARER CONTEXT REQUEST" message.

In on example, the PDN connection for the emergency bearer service may be established, if the UE has a PDP context or an EPS context for the emergency bearer service.

In on example, a range of the first time interval may be between 0.08 seconds and 5.12 seconds (e.g., for a UTRAN as defined in the 3GPP standard). In on example, a range of the second time interval or a range of the third time interval may be between 1.9 seconds and 52 minutes (e.g., for a UTRAN/E-UTRAN as defined in the 3GPP document(s)).

Figure 4:
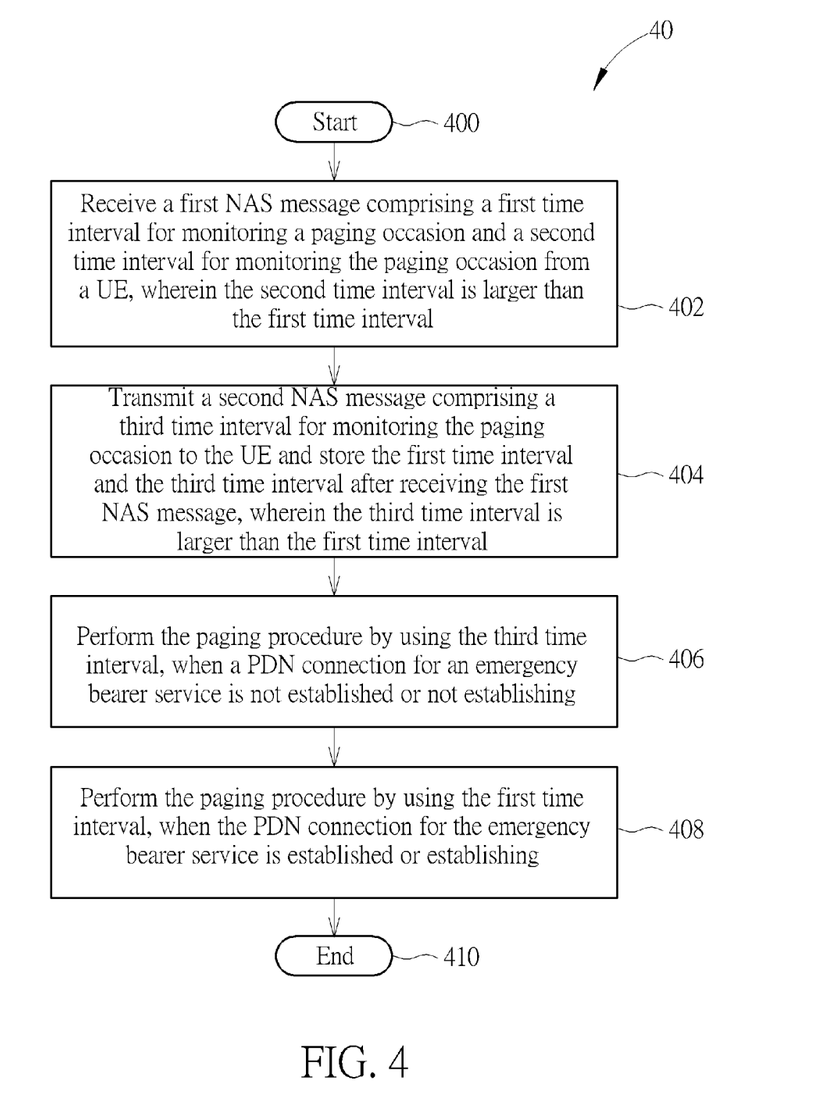
FIG. 4 is a flowchart of a process according to an example of the present invention.

FIG. 4 is a flowchart of a process 40 according to an example of the present invention. The process 40 may be utilized in a network, to handle a paging procedure in a wireless communication system. The process 40 includes the following steps:

Step 400: Start.

Step 402: Receive a first NAS message comprising a first time interval for monitoring a paging occasion and a second time interval for monitoring the paging occasion from a UE, wherein the second time interval is larger than the first time interval.

Step 404: Transmit a second NAS message comprising a third time interval for monitoring the paging occasion to the UE and store the first time interval and the third time interval after receiving the first NAS message, wherein the third time interval is larger than the first time interval.

Step 406: Perform the paging procedure by using the third time interval, when a PDN connection for an emergency bearer service is not established or not establishing.

Step 408: Perform the paging procedure by using the first time interval, when the PDN connection for the emergency bearer service is established or establishing.

Step 410: End.

According to the process 40, the network may receive a first NAS message including a first time interval for monitoring a paging occasion and a second time interval for monitoring the paging occasion from a UE, wherein the second time interval is larger than the first time interval. Then, the network may transmit a second NAS message including a third time interval for monitoring the paging occasion to the UE and may store the first time interval and the third time interval after (e.g., in response to) receiving the first NAS message, wherein the third time interval is larger than the first time interval. The network may perform the paging procedure by using the third time interval, when a PDN connection for an emergency bearer service is not established or not establishing. The network may perform the paging procedure by using the first time interval, when the PDN connection for the emergency bearer service is established or establishing. That is, the network uses a longer time interval (e.g., the third time interval) when the PDN connection for the emergency bearer service is not established or not establishing, and uses a shorter time interval (e.g., the first time interval) when the PDN connection for the emergency bearer service is established or establishing. The shorter and longer time intervals are stored in the network. In other words, the network is able to handle the paging procedure, no matter whether the PDN connection for the emergency bearer service is established or establishing, or is not established or not establishing. As a result, the problem of handling the paging procedure is solved.

Realization of the process 40 is not limited to the above description.

In on example, the first time interval may be used for a DRX parameter (i.e., non-extended DRX parameter or regular DRX), and/or the second time interval and the third time interval may be used for extended DRX parameters. In on example, the second time interval and the third time interval may be the same time interval or different time intervals.

In on example, the network may transmit the third time interval or the first time interval to a radio access network (RAN) node when performing the paging procedure, wherein the RAN node may perform the paging procedure by using the third time interval or the first time interval.

In on example, the network may include a Serving General Packet Radio Service (GPRS) Support Node (SGSN) or a MME. In on example, the RAN node may include an eNB or a UTRAN.

In on example, the first NAS message may be an "ATTACH REQUEST" message, a "ROUTING AREA UPDATE REQUEST" message or a "TRACKINGA AREA UPDATE REQUEST" message. In on example, the second NAS message may be an "ATTACH ACCEPT" message, a "ROUTING AREA UPDATE ACCEPT" message or a "TRACKINGA AREA UPDATE ACCEPT" message.

In on example, the PDN connection for the emergency bearer service may be establishing, if the network receives a SM message or an ESM message to activate a PDP context or an EPS context for the emergency bearer service but a complete procedure for establishing the PDP context or the EPS context is not completed. For example, the network (e.g., core network including MME) may transmit an "ACTIVATE DEFAULT EPS BEARER CONTEXT REQUEST" message after (e.g., in response to) receiving a "PDN CONNECTION REQUEST" message with a request type set to the emergency bearer service, and may not receive an "ACTIVATE DEFAULT EPS BEARER CONTEXT ACCEPT" message.

In on example, the PDN connection for the emergency bearer service may be established, if the network has a PDP context or an EPS context for the emergency bearer service.

In on example, a range of the first time interval may be between 0.08 seconds and 5.12 seconds (e.g., for a UTRAN as defined in the 3GPP standard). In on example, a range of the second time interval or a range of the third time interval may be between 1.9 seconds and 52 minutes (e.g., for a UTRAN/E-UTRAN as defined in the 3GPP document(s)).

An example is illustrated according to the processes 30 and 40 as follows. The example may be utilized in a situation that a UE is establishing a PDN connection for an emergency bearer service, while a radio link failure occurs or a Radio Resource Control (RRC) connection is released before the PDN connection for the emergency bearer service is established. The example may include the following steps:
1. A UE transmits an "ATTACH REQUEST" message including a first time interval (e.g., a DRX parameter corresponding to a DRX cycle length 0.08 seconds) and a second time interval (e.g., an extended DRX parameter corresponding to a DRX cycle length 1.9 seconds) to a network (e.g., core network including MME).
2. The network transmits an "ATTACH ACCEPT" message including a third time interval (e.g., the same or different extended DRX parameters corresponding to the DRX cycle length 1.9 seconds) to the UE.
3. The UE transmits an "ATTACH COMPLETE" message to the network.
4. A non-emergency PDN connection is established.
5. The UE transmits the third time interval to an Access Stratum (AS) layer (e.g., RRC layer), and the AS layer calculates a paging occasion by using the third time interval.
6. The network transmits a paging request including the third time interval to establish a data connection by using a default EPS bearer context created with a default access point name (APN) to an eNB. The eNB transmits the paging request to the UE by using the third time interval.
7. The UE receives the paging request, and establishes a NAS signaling connection. The UE and the network communicate with each other. The network releases the NAS signaling connection, and the UE and the network transfer to an idle mode, after communicating with each other.
8. The UE establishes an RRC connection, and transmits a "PDN CONNECTION REQUEST" message with a request type set to an emergency bearer service to establish the emergency bearer service. The UE starts timer T3482.
9. The network receives the "PDN CONNECTION REQUEST" message, and transmits an "ACTIVATE DEFAULT EPS BEARER CONTEXT REQUEST" message to the UE. The network starts timer T3485.
10. The UE receives the "ACTIVATE DEFAULT EPS BEARER CONTEXT REQUEST" message, and stops the timer T3482. The UE transmits an "ACTIVATE DEFAULT EPS BEARER CONTEXT ACCEPT" message to the AS to transmit the "ACTIVATE DEFAULT EPS BEARER CONTEXT ACCEPT" message to the network, but a radio link failure occurs before the UE transmits the "ACTIVATE DEFAULT EPS BEARER CONTEXT ACCEPT" message. The UE transfers to the idle mode.
11. The UE calculates the paging occasion by using the first time interval.
12. The timer T3485 expires in the network, and the network transmits another paging request including the first time interval to the eNB. The eNB transmits the other paging request to the UE by using the first time interval.
13. The UE receives the other paging request and establishes another NAS signaling connection. The network transmits another "ACTIVATE DEFAULT EPS BEARER CONTEXT REQUEST" message. The UE receives it, and responds with another "ACTIVATE DEFAULT EPS BEARER CONTEXT ACCEPT" message. The default EPS bearer context for the emergency bearer service is established. The network further establishes a dedicated EPS bearer context for the emergency bearer service.

Another example is illustrated according to the processes 30 and 40 as follows. The example may be utilized in a situation that a UE has a default EPS bearer context for an emergency bearer service, but a signaling connection is released or a radio link failure occurs before a dedicated EPS bearer for the emergency bearer service establishing. The example may include the following steps:
1. A UE transmits an "ATTACH REQUEST" message including a first time interval (e.g., a DRX parameter corresponding to a DRX cycle length 0.08 seconds) and a second time interval (e.g., an extended DRX parameter corresponding to a DRX cycle length 1.9 seconds) to a network (e.g., core network including MME).
2. The network transmits an "ATTACH ACCEPT" message including a third time interval (e.g., the same or different extended DRX parameters corresponding to the DRX cycle length 1.9 seconds) to the UE.
3. The UE transmits an "ATTACH COMPLETE" message to the network.
4. A non-emergency PDN connection is established.
5. The UE transmits the third time interval to an AS layer (e.g., RRC layer), and the AS layer calculates a paging occasion by using the third time interval.
6. The network transmits a paging request including the third time interval to establish a data connection by using a default EPS bearer context created with a default APN to an eNB. The eNB transmits the paging request to the UE by using the third time interval.
7. The UE receives the paging request, and establishes a radio access bearer. The UE and the network communicate with each other. The network releases the radio access bearer and the UE transfers to an idle mode, after communicating with each other.
8. The UE and the network establish a default EPS bearer context for an emergency bearer service.
9. The UE transfers to the idle mode because a radio link failure occurs or a RRC connection release occurs.
10. The UE calculates the paging occasion by using the first time interval.
11. The network transmits another paging request including the first time interval to the eNB. The eNB transmits the other paging request to the UE by using the first time interval.
12. The UE receives the other paging request, and establishes a signaling connection. The UE and the network establish a dedicated EPS bearer context for the emergency bearer service.

According to the above examples, both the UE and the network handle (e.g., monitor) the paging occasion by using the shorter time interval (i.e., the first time interval), when the PDN connection for the emergency bearer service is established or establishing. Both the UE and the network handle (e.g., monitor) the paging occasion by using the longer time interval (i.e., the third time interval), when the PDN connection for the emergency bearer service is not established or not establishing. In other words, the UE and the network are synchronous for performing the paging procedure, no matter whether the PDN connection for the emergency bearer service is established or establishing, or is not established or not establishing. As a result, the problem of the paging procedure is solved.

Figure 5:
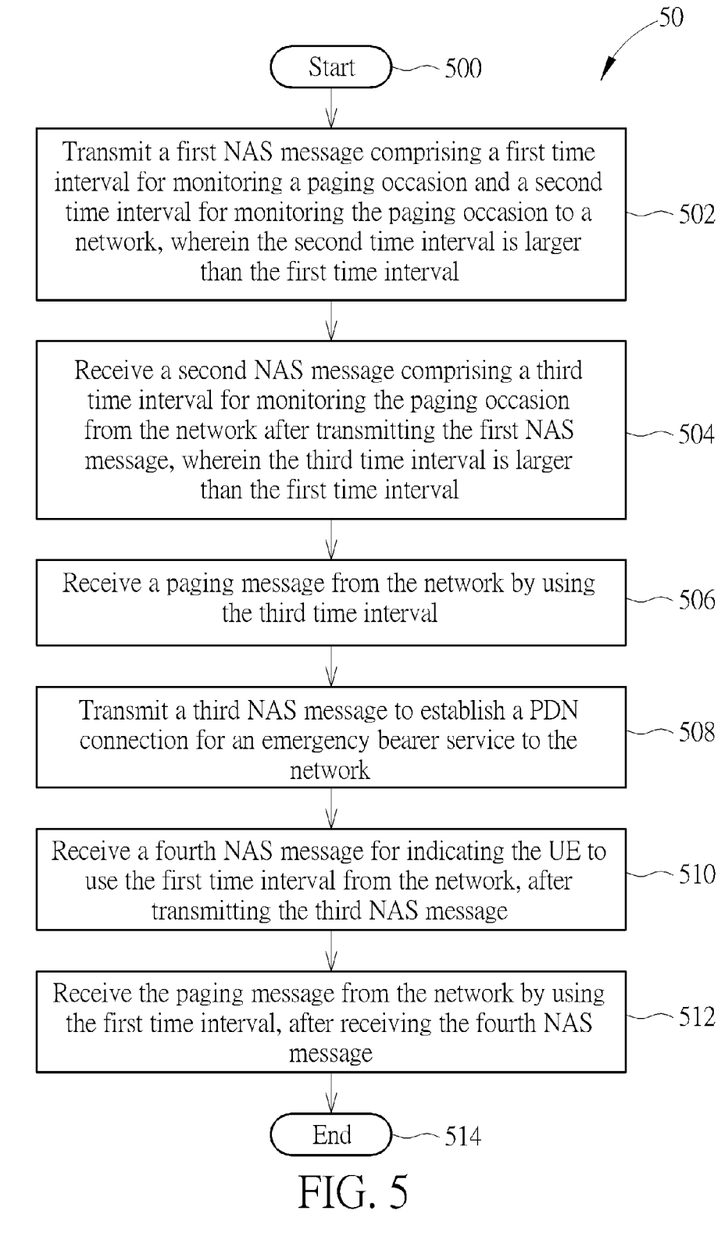
FIG. 5 is a flowchart of a process according to an example of the present invention.

FIG. 5 is a flowchart of a process 50 according to an example of the present invention. The process 50 may be utilized in a UE, to handle a paging procedure in a wireless communication system. The process 50 includes the following steps:

Step 500: Start.

Step 502: Transmit a first NAS message comprising a first time interval for monitoring a paging occasion and a second time interval for monitoring the paging occasion to a network, wherein the second time interval is larger than the first time interval.

Step 504: Receive a second NAS message comprising a third time interval for monitoring the paging occasion from the network after transmitting the first NAS message, wherein the third time interval is larger than the first time interval.

Step 506: Receive a paging message from the network by using the third time interval.

Step 508: Transmit a third NAS message to establish a PDN connection for an emergency bearer service to the network.

Step 510: Receive a fourth NAS message for indicating the UE to use the first time interval from the network, after transmitting the third NAS message.

Step 512: Receive the paging message from the network by using the first time interval, after receiving the fourth NAS message.

Step 514: End.

According to the process 50, the UE may transmit a first NAS message including a first time interval for monitoring a paging occasion and a second time interval for monitoring the paging occasion to a network, wherein the second time interval is larger than the first time interval. The UE may receive a second NAS message in response to the first NAS message including a third time interval for monitoring the paging occasion from the network after (e.g., in response to) transmitting the first NAS message, wherein the third time interval is larger than the first time interval. Then, the UE may receive a paging message from the network by using the third time interval. Further, the UE may transmit a third NAS message to establish a PDN connection for an emergency bearer service to the network. The UE may receive a fourth NAS message in response to the third NAS message for indicating (e.g., commanding) the UE to use the first time interval from the network, after (e.g., in response to) transmitting the third NAS message. Then, the UE may receive the paging message from the network by using the first time interval, after (e.g., in response to) receiving the fourth NAS message. That is, the UE is indicated to use a shorter time interval (e.g., the first time interval) by the fourth NAS message transmitted from the network, when the PDN connection for the emergency bearer service is establishing. In other words, the UE and the network are synchronous for performing the paging procedure, no matter whether the PDN connection for the emergency bearer service is established or establishing, or is not established or not establishing. As a result, the problem of handling the paging procedure is solved.

Realization of the process 50 is not limited to the above description.

In on example, the first time interval may be used for a DRX parameter (i.e., non-extended DRX parameter or regular DRX), and/or the second time interval and the third time interval may be used for extended DRX parameters. In on example, the second time interval and the third time interval may be the same time interval or different time intervals.

In on example, the first NAS message may be an "ATTACH REQUEST" message, a "ROUTING AREA UPDATE REQUEST" message or a "TRACKING AREA UPDATE REQUEST" message. In on example, the second NAS message may be an "ATTACH ACCEPT" message, a "ROUTING AREA UPDATE ACCEPT" message or a "TRACKINGA AREA UPDATE ACCEPT" message.

In on example, the first time interval may be encoded in a DRX parameter information element of the "ATTACH REQUEST" message, the "ROUTING AREA UPDATE REQUEST" message or the "TRACKINGA AREA UPDATE REQUEST" message. In on example, the second time interval and the third time interval may be encoded in an extended DRX parameter information element (e.g., as defined in the 3GPP document(s)).

In on example, the third NAS message and the fourth NAS message are SM messages or ESM messages. For example, the third NAS message may be a "PDN CONNECTIVITY REQUEST" message, and the fourth NAS message may be an "ACTIVATE DEFAULT EPS BEARER CONTEXT REQUEST" message.

In on example, the UE may establish the PDN connection for the emergency bearer service by transmitting a SM message or an ESM message to activate a PDP context or an EPS context for the emergency bearer service, but a complete procedure for establishing the PDP context or the EPS context is not completed. For example, the UE may transmit a "PDN CONNECTION REQUEST" message with a request type set to the emergency bearer service, and may not receive an "ACTIVATE DEFAULT EPS BEARER CONTEXT REQUEST" message.

In on example, the PDN connection for the emergency bearer service may include a PDP context or an EPS context for the emergency bearer service.

Figure 6:
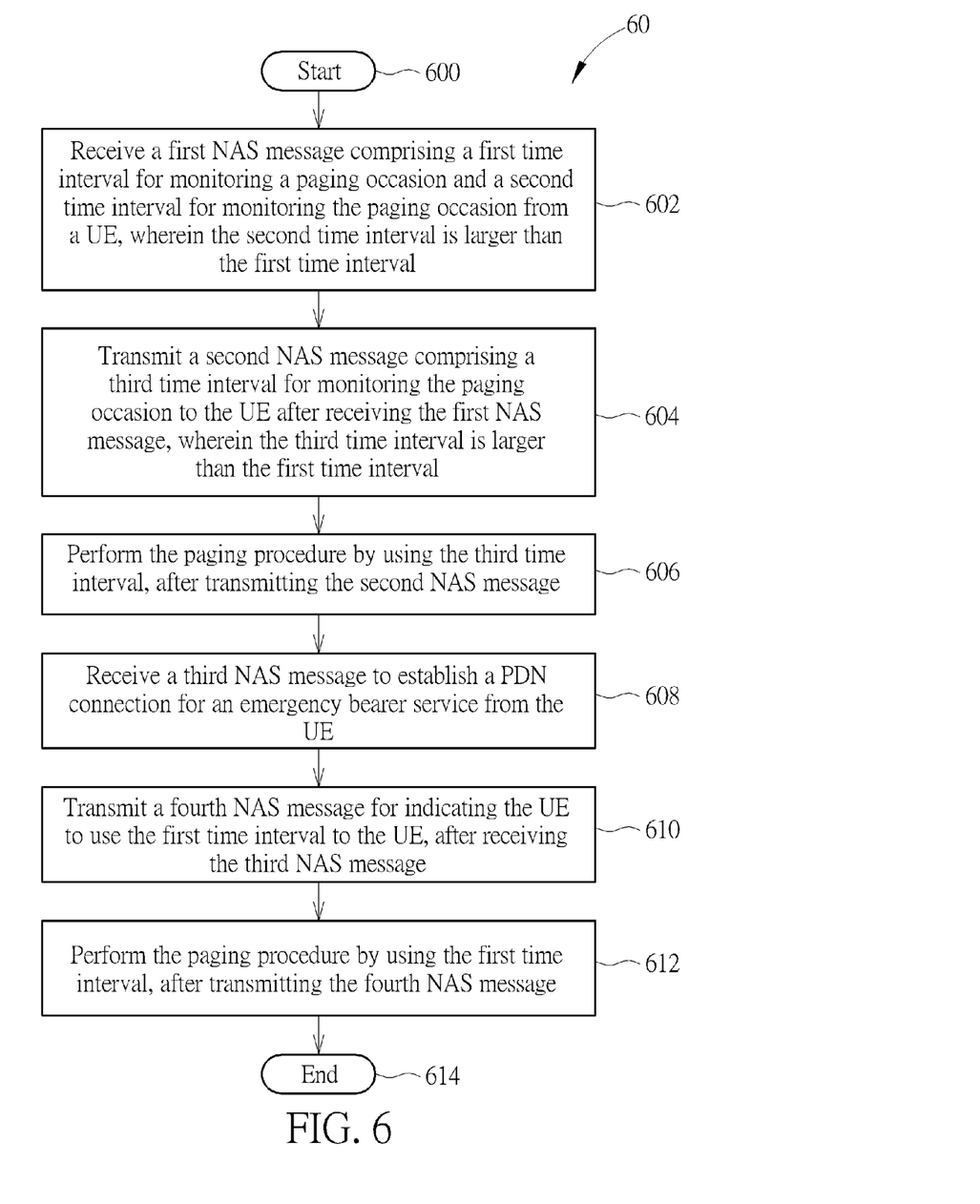
FIG. 6 is a flowchart of a process according to an example of the present invention.

FIG. 6 is a flowchart of a process 60 according to an example of the present invention. The process 60 may be utilized in a network, to handle a paging procedure in a wireless communication system. The process 60 includes the following steps:

Step 600: Start.

Step 602: Receive a first NAS message comprising a first time interval for monitoring a paging occasion and a second time interval for monitoring the paging occasion from a UE, wherein the second time interval is larger than the first time interval.

Step 604: Transmit a second NAS message comprising a third time interval for monitoring the paging occasion to the UE after receiving the first NAS message, wherein the third time interval is larger than the first time interval.

Step 606: Perform the paging procedure by using the third time interval, after transmitting the second NAS message.

Step 608: Receive a third NAS message to establish a PDN connection for an emergency bearer service from the UE.

Step 610: Transmit a fourth NAS message for indicating the UE to use the first time interval to the UE, after receiving the third NAS message.

Step 612: Perform the paging procedure by using the first time interval, after transmitting the fourth NAS message.

Step 614: End.

According to the process 60, the network may receive a first NAS message including a first time interval for monitoring a paging occasion and a second time interval for monitoring the paging occasion from a UE, wherein the second time interval is larger than the first time interval. The network may transmit a second NAS message including a third time interval for monitoring the paging occasion to the UE after receiving the first NAS message, wherein the third time interval is larger than the first time interval. Then, the network may perform the paging procedure by using the third time interval, after transmitting the second NAS message. Further, the network may receive a third NAS message to establish a PDN connection for an emergency bearer service from the UE. The network may transmit a fourth NAS message for indicating (e.g., commanding) the UE to use the first time interval to the UE, after receiving the third NAS message. Then, the network may perform the paging procedure by using the first time interval, after transmitting the fourth NAS message. That is, the network indicates the UE to use a shorter time interval (e.g., the first time interval) by the fourth NAS message, when the PDN connection for the emergency bearer service is establishing. In other words, the UE and the network are synchronous for performing the paging procedure, no matter whether the PDN connection for the emergency bearer service is established or establishing, or is not established or not establishing. As a result, the problem of handling the paging procedure is solved.

Realization of the process 60 is not limited to the above description.

In on example, the first time interval may be used for a DRX parameter (i.e., non-extended DRX parameter or regular DRX), and/or the second time interval and the third time interval may be used for extended DRX parameters. In on example, the second time interval and the third time interval may be the same time interval or different time intervals.

In on example, the network may transmit the third time interval or the first time interval to a RAN node when performing the paging procedure, wherein the RAN node performs the paging procedure by using the third time interval or the first time interval.

In on example, the network may include a SGSN or a MME. In on example, the RAN node may include an eNB or a UTRAN.

In on example, the first NAS message may be an "ATTACH REQUEST" message, a "ROUTING AREA UPDATE REQUEST" message or a "TRACKING AREA UPDATE REQUEST" message. In on example, the second NAS message may be an "ATTACH ACCEPT" message, a "ROUTING AREA UPDATE ACCEPT" message or a "TRACKING AREA UPDATE ACCEPT" message.

In on example, the third NAS message and the fourth NAS message are SM messages or ESM messages. For example, the third NAS message may be a "PDN CONNECTIVITY REQUEST" message, and the fourth NAS message may be an "ACTIVATE DEFAULT EPS BEARER CONTEXT REQUEST" message.

It should be noted that although the above examples are illustrated to clarify the related operations of corresponding processes. The examples can be combined and/or modified arbitrarily according to system requirements and/or design considerations.

Those skilled in the art should readily make combinations, modifications and/or alterations on the abovementioned description and examples. Any of the abovementioned processes may be compiled into the program code 214. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means be the communication device 20.

To sum up, the present invention provides a method and related communication device for handling the paging procedure. Thus, the UE and the network are able to handle the paging procedure, no matter whether the PDN connection for the emergency bearer service is established or establishing, or is not established or not establishing. As a result, the problem of handling the paging procedure is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a paging procedure in a wireless communication system, comprising:
   a storage device; and
   a processing circuit, coupled to the storage device, wherein the storage device stores, and the processing circuit is configured to execute, the instructions of:
   transmitting a first Non Access Stratum (NAS) message comprising a first time interval and a second time interval to a network, wherein the first time interval and the second time interval are for monitoring a paging occasion and the second time interval is larger than the first time interval;
   receiving a second NAS message comprising a third time interval from the network after transmitting the first NAS message, wherein the third time interval is for monitoring the paging occasion and is larger than the first time interval;
   receiving a paging message from the network by using the third time interval, when a packet data network (PDN) connection for an emergency bearer service is not established or not establishing; and
   receiving the paging message from the network by using the first time interval, when the PDN connection for the emergency bearer service is established or establishing;
   wherein the first time interval is encoded in a discontinuous reception (DRX) parameter information element, and the second time interval and the third time interval are encoded in an extended DRX parameter information element.

2. The communication device of claim 1, wherein the first NAS message is an "ATTACH REQcommunication deviceST" message, a "ROUTING AREA UPDATE REQcommunication deviceST" message or a "TRACKING AREA UPDATE REQcommunication deviceST" message, and/or the second NAS message is an "ATTACH ACCEPT" message, a "ROUTING AREA UPDATE ACCEPT" message or a "TRACKING AREA UPDATE ACCEPT" message.

3. The communication device of claim 2, wherein the first time interval is encoded in the DRX parameter information element of the "ATTACH REQcommunication deviceST" message, the "ROUTING AREA UPDATE REQcommunication deviceST" message or the "TRACKING AREA UPDATE REQcommunication deviceST" message.

4. The communication device of claim 1, wherein the PDN connection for the emergency bearer service is establishing, if the communication device transmits a session management (SM) message or an Evolved Packet Service (EPS) SM (ESM) message to activate a Packet Data Protocol (PDP) context or an EPS context for the emergency bearer service but a complete procedure for establishing the PDP context or the EPS context is not completed.

5. The communication device of claim 1, wherein the PDN connection for the emergency bearer service is established, if the communication device has a PDP context or an EPS context for the emergency bearer service.

6. The communication device of claim 1, wherein a range of the first time interval is between 0.08 seconds and 5.12 seconds, and/or a range of the second time interval or a range of the third time interval is between 1.9 seconds and 52 minutes.

7. A network for handling a paging procedure in a wireless communication system, comprising:
  a storage device; and
  a processing circuit, coupled to the storage device, wherein the storage device stores, and the processing circuit is configured to execute, the instructions of:
  receiving a first Non Access Stratum (NAS) message comprising a first time interval and a second time interval from a communication device, wherein the first time interval and the second time interval are for monitoring a paging occasion and the second time interval is larger than the first time interval;
  transmitting a second NAS message comprising a third time interval to the communication device and storing the first time interval and the third time interval after receiving the first NAS message, wherein the third time interval is for monitoring the paging occasion and is larger than the first time interval;
  performing the paging procedure by using the third time interval, when a packet data network (PDN) connection for an emergency bearer service is not established or not establishing; and
  performing the paging procedure by using the first time interval, when the PDN connection for the emergency bearer service is established or establishing;
  wherein the first time interval is encoded in a discontinuous reception (DRX) parameter information element, and the second time interval and the third time interval are encoded in an extended DRX parameter information element.

8. The network of claim 7, wherein the instruction of performing the paging procedure by using the third time interval or the first time interval comprises:
  transmitting the third time interval or the first time interval to a radio access network (RAN) node when performing the paging procedure, wherein the RAN node performs the paging procedure by using the third time interval or the first time interval.

9. The network of claim 8, wherein the network comprises a Serving General Packet Radio Service (GPRS) Support Node (SGSN) or a Mobility Management Entity (MME), and/or the RAN node comprises an evolved NodeB (eNB) or a Universal Terrestrial Radio Access Network Universal (UTRAN).

10. The network of claim 7, wherein the first NAS message is an "ATTACH REQcommunication deviceST" message, a "ROUTING AREA UPDATE REQcommunication deviceST" message or a "TRACKINGA AREA UPDATE REQcommunication deviceST" message, and/or the second NAS message is an "ATTACH ACCEPT" message, a "ROUTING AREA UPDATE ACCEPT" message or a "TRACKINGA AREA UPDATE ACCEPT" message.

11. The network of claim 7, wherein the PDN connection for the emergency bearer service is establishing, if the network receives a session management (SM) message or an Evolved Packet Service (EPS) SM (ESM) message to activate a Packet Data Protocol (PDP) context or an EPS context for the emergency bearer service but a complete procedure for establishing the PDP context or the EPS context is not completed.

12. The network of claim 7, wherein the PDN connection for the emergency bearer service is established, if the network has a PDP context or an EPS context for the emergency bearer service.

13. The network of claim 7, wherein a range of the first time interval is between 0.08 seconds and 5.12 seconds, and/or a range of the second time interval or a range of the third time interval is between 1.9 seconds to 52 minutes.

14. A communication device for handling a paging procedure in a wireless communication system, comprising:
  a storage device; and
  a processing circuit, coupled to the storage device, wherein the storage device stores, and the processing circuit is configured to execute, the instructions of:
  transmitting a first Non Access Stratum (NAS) message comprising a first time interval and a second time interval to a network, wherein the first time interval and the second time interval are for monitoring a paging occasion and the second time interval is larger than the first time interval;
  receiving a second NAS message comprising a third time interval from the network after transmitting the first NAS message, wherein the third time interval is for monitoring the paging occasion and is larger than the first time interval;
  receiving a paging message from the network by using the third time interval;
  transmitting a third NAS message to establish a packet data network (PDN) connection for an emergency bearer service to the network;
  receiving a fourth NAS message for indicating the communication device to use the first time interval from the network, after transmitting the third NAS message; and
  receiving the paging message from the network by using the first time interval, after receiving the fourth NAS message;
  wherein the first time interval is encoded in a discontinuous reception (DRX) parameter information element, and the second time interval and the third time interval are encoded in an extended DRX parameter information element.

15. The communication device of claim 14, wherein the first NAS message is an "ATTACH REQcommunication deviceST" message, a "ROUTING AREA UPDATE REQcommunication deviceST" message or a "TRACKINGA AREA UPDATE REQcommunication deviceST" message, and/or the second NAS message is an "ATTACH ACCEPT" message, a "ROUTING AREA UPDATE ACCEPT" message or a "TRACKINGA AREA UPDATE ACCEPT" message.

16. The communication device of claim 15, wherein the first time interval is encoded in the DRX parameter information element of the "ATTACH REQcommunication deviceST" message, the "ROUTING AREA UPDATE REQcommunication deviceST" message or the "TRACKINGA AREA UPDATE REQcommunication deviceST" message.

17. The communication device of claim 14, wherein the third NAS message and the fourth NAS message are session management (SM) messages or Evolved Packet Service (EPS) SM (ESM) messages.

18. The communication device of claim 14, wherein the instruction of establishing the PDN connection for the emergency bearer service comprising:
  transmitting a SM message or an ESM message to activate a Packet Data Protocol (PDP) context or an EPS context for the emergency bearer service, but a complete procedure for establishing the PDP context or the EPS context is not completed.

19. The communication device of claim 14, wherein the PDN connection for the emergency bearer service comprises a PDP context or an EPS context for the emergency bearer service.

* * * * *